O. R. WIKANDER.
VALVE FOR AIR COMPRESSORS.
APPLICATION FILED MAY 23, 1917.
1,324,137.
Patented Dec. 9, 1919.
2 SHEETS—SHEET 1.
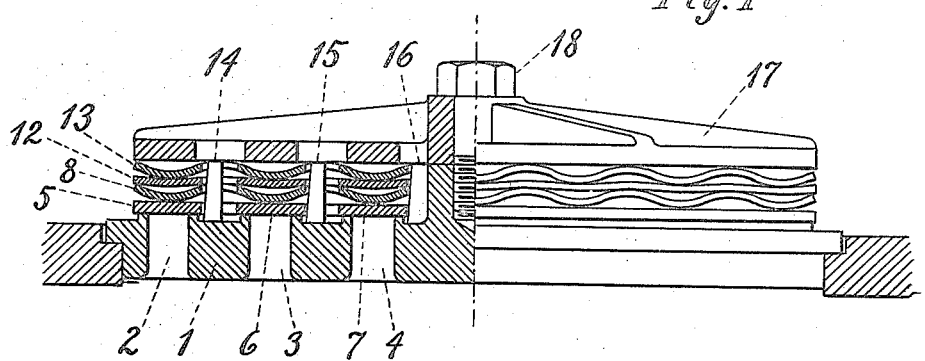
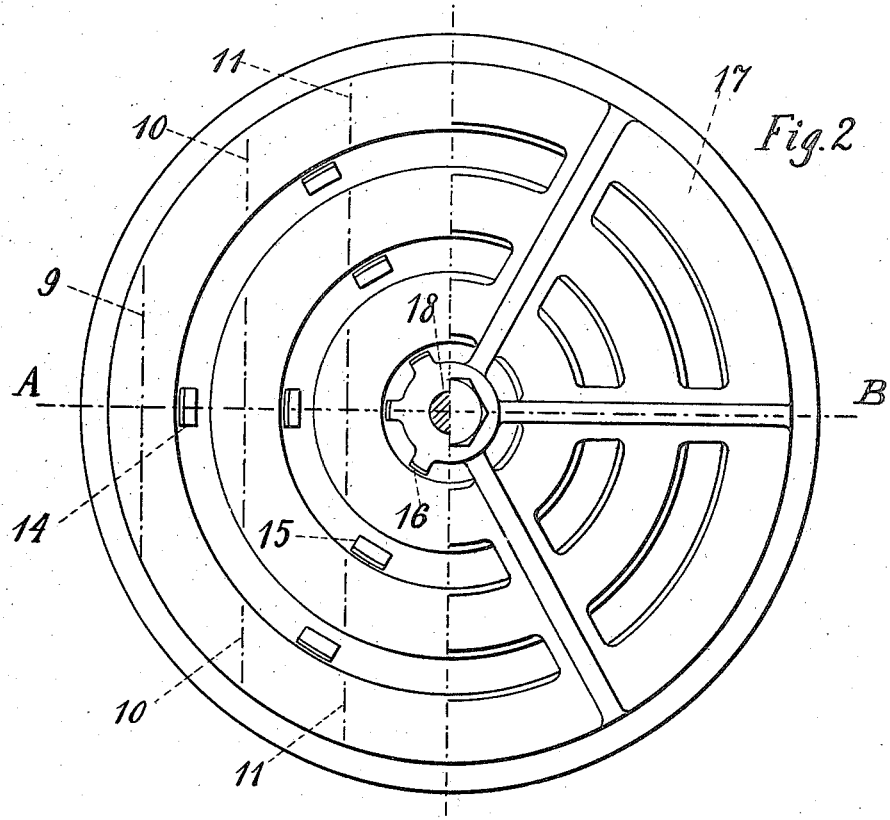
WITNESSES
Ben H. Dittmar
Ida Grobe.
INVENTOR
Oscar Ragnar Wikander

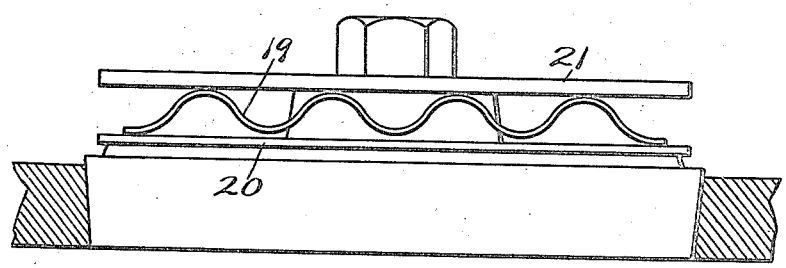
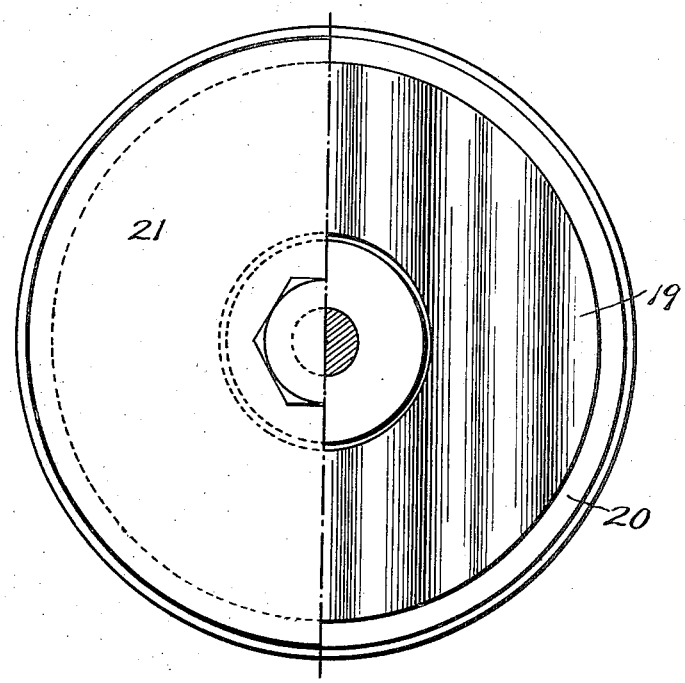
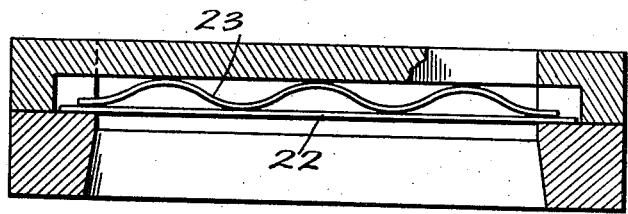

UNITED STATES PATENT OFFICE.

OSCAR RAGNAR WIKANDER, OF PITTSBURGH, PENNSYLVANIA, ASSIGNOR TO WORTHINGTON PUMP AND MACHINERY CORPORATION, A CORPORATION OF VIRGINIA.

VALVE FOR AIR-COMPRESSORS.

1,324,137. Specification of Letters Patent. Patented Dec. 9, 1919.

Application filed May 23, 1917. Serial No. 170,439.

*To all whom it may concern:*

Be it known that I, OSCAR RAGNAR WIKANDER, a citizen of the United States, residing at Pittsburgh, in the county of Allegheny and State of Pennsylvania, have invented a new and useful Valve for Air-Compressors of the Type Generally Designated as a Plate-Valve, and of which the following is a specification.

The purpose of this invention is to produce a valve for air compressors and similar machinery, which combines simplicity of design, great durability in service, even distribution of the pressure of the valve springs over the entire surface of the valve plates and evenly distributed powerful cushioning of the lifting valve. This construction also prevents vibration of the valve.

The characteristic feature of this invention is that the valve spring consists, either entirely or partly, of a corrugated spring plate. The valve spring may consist of a number of plates, of which one is corrugated and the balance straight, curved or corrugated, all spring plates being of similar outline as the valve plate itself.

One embodiment of this invention, as applied to a multiring valve, is represented in Figures 1 and 2 of the attached drawings. Figs. 3 and 4 show an embodiment of the broader features of the invention in a one ring valve with a single corrugated spring. Fig. 5 shows an embodiment of the broader features of the invention in a rectangular or strip valve with a single corrugated spring.

Fig. 1 shows one half of the valve in section along the line A—B of Fig. 2, and the other half in outline. Fig. 2 represents a plan view of the same valve, one half of which is shown with the stop plate, the other half without.

In the drawing 1 designates the valve seat, which is provided with concentric, annular valve openings 2, 3 and 4. These openings are covered by annular valve plates 5, 6 and 7. The valve plate 5 is pressed down along the valleys of the corrugation in the valve spring 8. These valleys are indicated in Fig. 2 by the parallel lines 9, 10 and 11.

A flat valve spring 12 bears on the crests of the corrugations of the valve spring 8 and on the top of the former another corrugated valve spring 13, of the same outline as the valve spring 8, is placed.

The valve rings 6 and 7 are in the same way held down by means of two corrugated valve springs with a flat one interposed between them.

The valve plates 5, 6 and 7 are kept in place and guided by means of projections 14, 15 and 16, which are placed in suitable manner around the circumference of the annular valve plates.

The upper springs bear against a stop plate 17, which, by means of a bolt 18, is secured to the valve seat 1.

During the first part of the lift the valve springs will exert a pressure on the valve plates, which is proportional to their compression, while said springs during the latter part of the lift, will fit against each other completely and, acting in parallel, will exert a very powerful cushioning effect on the motion of the valve plates, so as to avoid hard blows against the stop plate. During the action of the valve a certain lateral motion of the crests and valleys of the corrugated valve springs takes place and this motion produces sufficient friction so as to prevent any vibration or chattering of the valve.

Fig. 3 is an elevation of a one ring disk valve, in which one corrugated spring plate 19 forms the spring backing for the single disk 20 and bears against the abutment 21, and Fig. 4 shows the same construction in sectional plan view.

Fig. 5 shows a rectangular or strip valve 22, the spring backing of which consists of one corrugated plate or strip 23, interposed between the valve 22 and cap 24.

The above embodiments of my invention apply to plate valves, but it is evident that a corrugated spring plate can be used to limit the lift of any type of automatic valve, without parting from the spirit of this invention. It is also evident that rectangular valve plates or such of any other shape may be used.

What I claim is:

1. A valve comprising, in combination, a valve seat and a valve disk coöperating therewith, a stop member for limiting the opening movement of the latter and a valve spring comprising a plate of resilient material having parallel corrugations, interposed between the valve disk and the stop member.

2. A valve comprising, in combination, a valve seat and a valve disk coöperating therewith, a stop member for limiting the opening movement of the latter and a number of alternating corrugated and straight plates of resilient material, interposed between the valve disk and the stop member.

3. A valve comprising, in combination, a valve seat and a valve member coöperating therewith, a stop member for limiting the opening movement of the latter, and a valve spring comprising a plate of resilient material having parallel corrugations, interposed between the valve member and stop member.

4. A valve comprising, in combination, a valve seat and a valve member coöperating therewith, a stop member for limiting the opening movement of the latter, and a number of alternating corrugated and straight plates of resilient material, said corrugated plates having parallel corrugations, interposed between the valve member and stop member.

5. A valve comprising, in combination, a valve seat and a valve member coöperating therewith, a stop member for limiting the opening movement of the latter, and a number of alternating corrugated and straight plates of resilient material, interposed between the valve member and stop member.

6. A valve comprising, in combination, a valve seat and a valve disk coöperating therewith, a stop member for limiting the opening movement of the latter, and a number of alternating corrugated and straight plates of resilient material, said corrugated plates having parallel corrugations interposed between the valve disk and stop member.

OSCAR RAGNAR WIKANDER.

Witnesses:
   IDA GROBE,
   WILLIAM F. GERDES.